Jan. 22, 1963   W. J. REELY   3,075,043
PUNCHED CARD TO TELETYPEWRITER CODE CONVERTER
Filed March 14, 1960   6 Sheets-Sheet 1

Fig. 1

| (Punch Locations of Storage Cards) | | Platen Position | | (5 Unit Teletypewriter Code) -Impulses- | | | | | | |
|---|---|---|---|---|---|---|---|---|---|---|
| Letters | Figs. | Ltrs. | Figs. | Start | 1 | 2 | 3 | 4 | 5 | Stop |
| 12-1 |  | A |  |  |  |  |  |  |  |  |
| 12-2 |  | B |  |  |  |  |  |  |  |  |
| 12-3 |  | C |  |  |  |  |  |  |  |  |
| 12-4 |  | D |  |  |  |  |  |  |  |  |
| 12-5 | 3 | E | 3 |  |  |  |  |  |  |  |
| 12-6 |  | F |  |  |  |  |  |  |  |  |
| 12-7 |  | G |  |  |  |  |  |  |  |  |
| 12-8 |  | H |  |  |  |  |  |  |  |  |
| 12-9 | 8 | I | 8 |  |  |  |  |  |  |  |
| 11-1 |  | J |  |  |  |  |  |  |  |  |
| 11-2 |  | K |  |  |  |  |  |  |  |  |
| 11-3 |  | L |  |  |  |  |  |  |  |  |
| 11-4 |  | M |  |  |  |  |  |  |  |  |
| 11-5 |  | N |  |  |  |  |  |  |  |  |
| 11-6 | 9 | O | 9 |  |  |  |  |  |  |  |
| 11-7 | 0 | P | 0 |  |  |  |  |  |  |  |
| 11-8 | 1 | Q | 1 |  |  |  |  |  |  |  |
| 11-9 | 4 | R | 4 |  |  |  |  |  |  |  |
| 0-2 |  | S |  |  |  |  |  |  |  |  |
| 0-3 | 5 | T | 5 |  |  |  |  |  |  |  |
| 0-4 | 7 | U | 7 |  |  |  |  |  |  |  |
| 0-5 |  | V |  |  |  |  |  |  |  |  |
| 0-6 | 2 | W | 2 |  |  |  |  |  |  |  |
| 0-7 |  | X |  |  |  |  |  |  |  |  |
| 0-8 | 6 | Y | 6 |  |  |  |  |  |  |  |
| 0-9 |  | Z |  |  |  |  |  |  |  |  |
| Functions | Carriage Ret'n |  |  |  |  |  |  |  |  |  |
|  | Line Feed |  |  |  |  |  |  |  |  |  |
|  | Space |  |  |  |  |  |  |  |  |  |
|  | Letter Shift |  |  |  |  |  |  |  |  |  |
|  | Figures Shift |  |  |  |  |  |  |  |  |  |

|←22→|←22→|←22→|←22→|←22→|←22→|←31→|

☐ Marking Pulses
▨ Spacing Pulses

Impulse Lengths in Milli-
seconds at Standard
Speed of 60 words per
Minute

INVENTOR:
Walter J. Reely
By Smyth, Roston & Pavitt
Attorneys.

Jan. 22, 1963 W. J. REELY 3,075,043
PUNCHED CARD TO TELETYPEWRITER CODE CONVERTER
Filed March 14, 1960 6 Sheets-Sheet 2

INVENTOR:
Walter J. Reely
By Smyth, Roston & Pavitt
Attorneys.

Jan. 22, 1963  W. J. REELY  3,075,043
PUNCHED CARD TO TELETYPEWRITER CODE CONVERTER
Filed March 14, 1960  6 Sheets-Sheet 3

INVENTOR:
Walter J. Reely

Attorneys

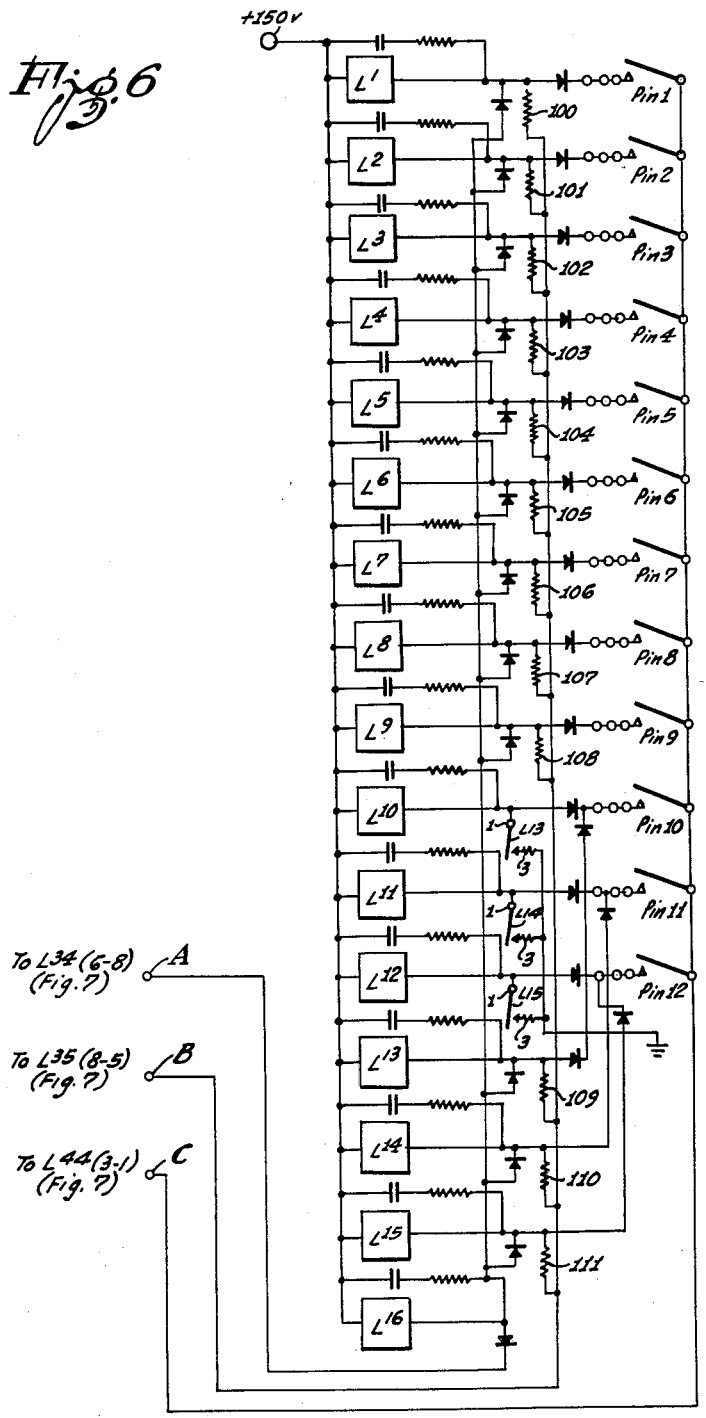

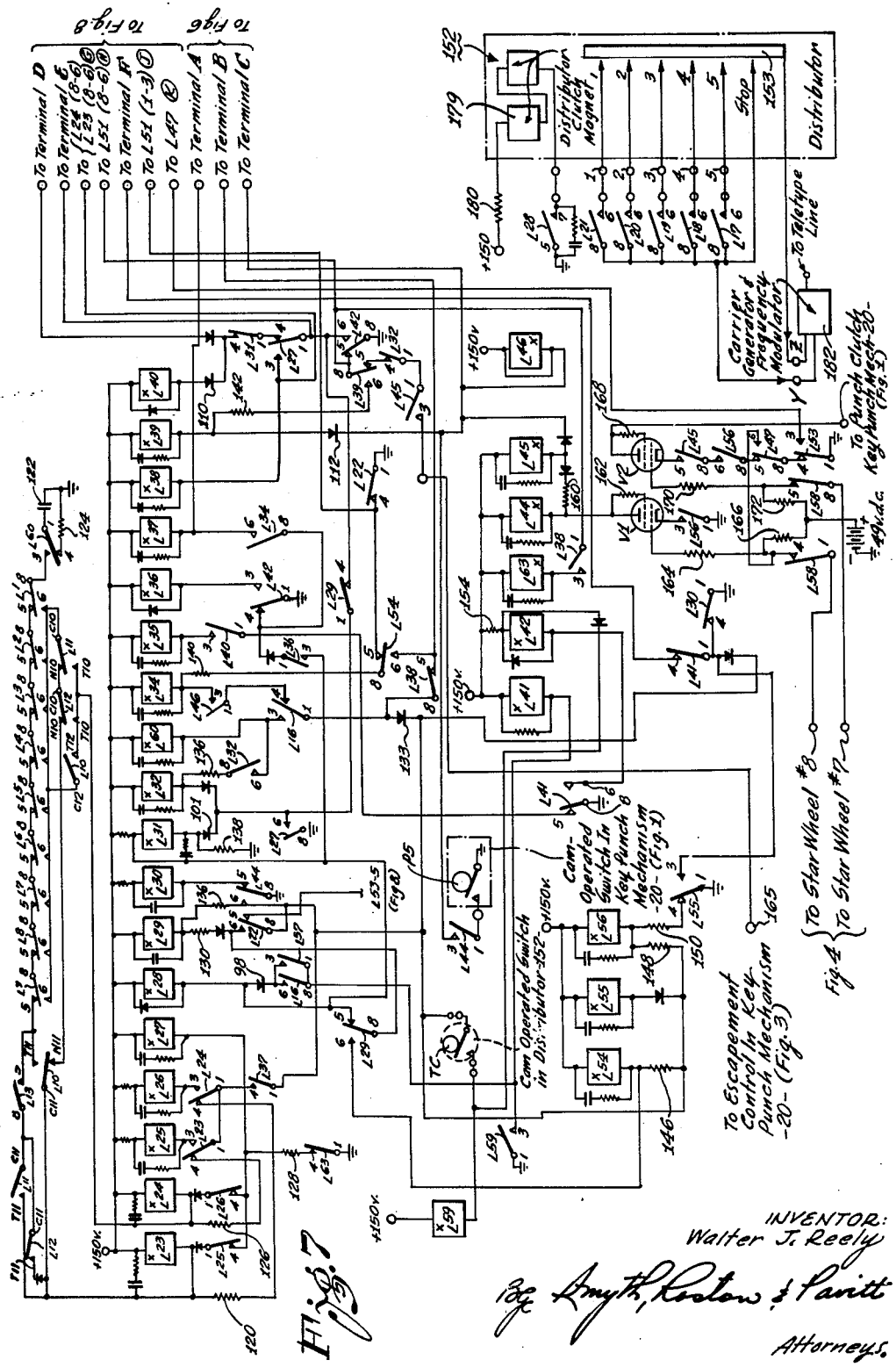

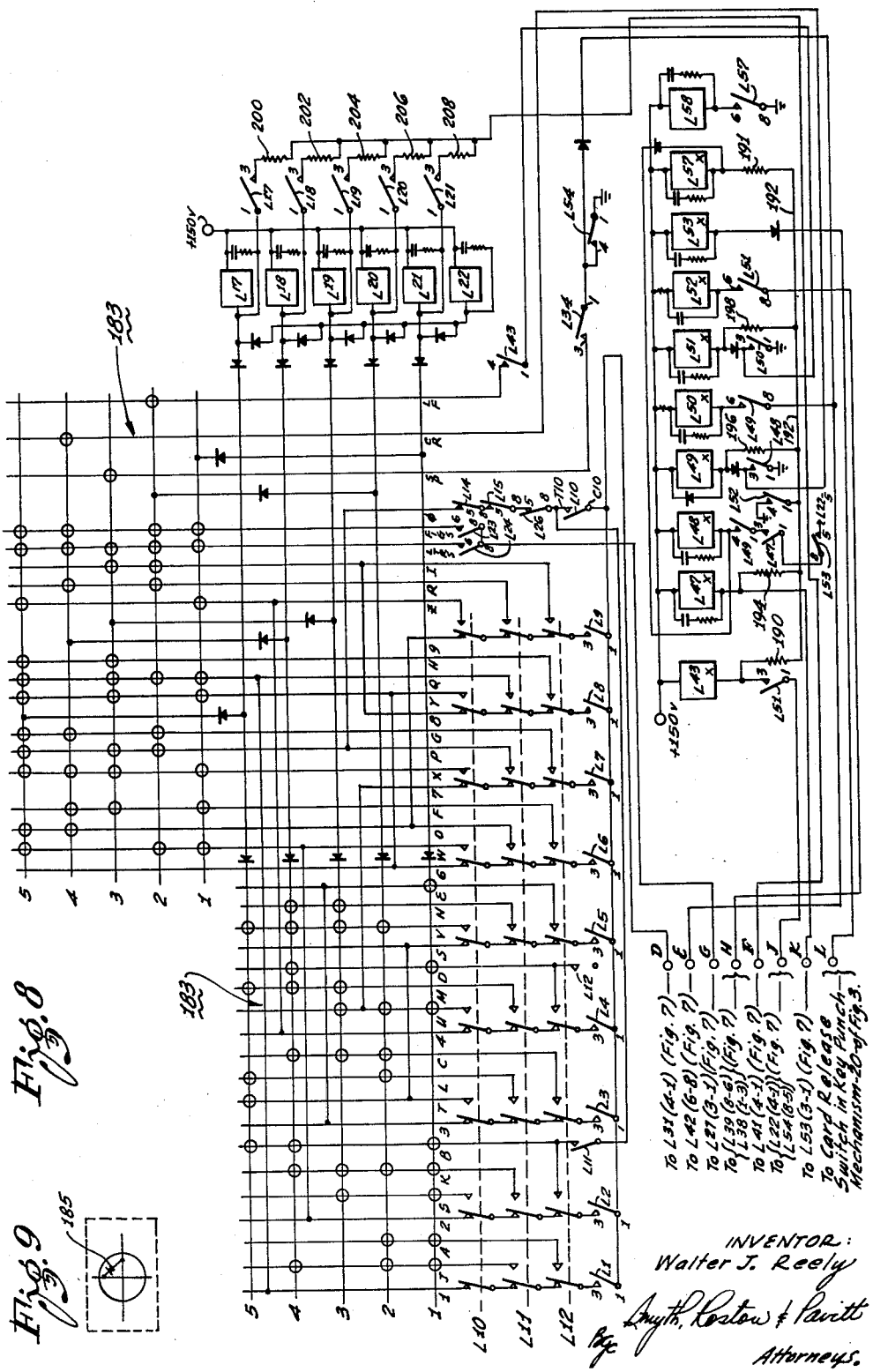

United States Patent Office 3,075,043
Patented Jan. 22, 1963

3,075,043
PUNCHED CARD TO TELETYPEWRITER
CODE CONVERTER
Walter J. Reely, Manhattan Beach, Calif., assignor, by mesne assignments, to General Instrument Corporation, Hawthorne, Calif., a corporation of New Jersey
Filed Mar. 14, 1960, Ser. No. 14,609
22 Claims. (Cl. 178—26)

The present invention relates generally to apparatus and systems in which one instrumentality is inter-coupled to another, so that the latter instrumentality may be controlled in accordance with information derived from the former. The invention is more particularly concerned with such inter-coupled apparatus and systems in which an information storage card sensing mechanism is coupled into a teletypewriter system.

The inter-coupled apparatus and system of the invention permits data recorded on successive information storage cards sensed by the card sensing mechanism to be introduced directly into a teletypewriter transmitter-receiver unit for communication to one or more teletypewriter receivers, and for direct reproduction by such receivers.

As is well known, the usual teletypewriter system includes a combined transmitter and receiver at each station. The system is so conceived that whenever a message is typed out at any particular station, the identical message is typed out and converted to a printed text at one or more selected remote stations.

The usual teletypewriter system uses a 5-unit permutation code in which each unit is binary, having one of two values. These values in accordance with usual telegraphy terminology are generally referred to as "mark" and "space." With this arrangement, each different transmitted character is represented by a corresponding configuration of the 5-unit code. The characters are usually transmitted in serial form on a high frequency alternating current carrier wave. The mark and space signals of the different characters are usually frequency modulated on the high frequency carrier wave, with each binary unit in the individual characters establishing the carrier wave as a "mark" frequency for one of the two binary values and at a "space" frequency for the other of the binary values.

With the code discussed briefly in the preceding paragraph, it is possible to obtain 32 different combinations. Twenty-six of these combinations are assigned to the letters of the alphabet. One of the remaining six code combinations is used to designate an idle condition, and the other five code combinations are used to perform certain functions at the remote receiver. These functions include, for example, "carriage return," "line feed," "space," "letters shift" and "figures shift." Whenever a "letters shift" code combination is transmitted to the receivers, the receiver keyboard is actuated to the "letters" position and it remains in that position until a "figures shift" code is received. Upon the receipt of the "figures shift" code combination, the receiver keyboard is actuated to its "figures" position so that figures are typed out instead of the letters referred to above, and it remains at the latter position until the next "letters shift" code combination is received.

The teletypewriters include a distributor, a carrier wave generator and a frequency modulator. Each of the pulses referred to above serves to actuate the frequency modulator so that the carrier wave is shifted between the mark frequency and the space frequency for the duration of each pulse. At the end of each group of pulses, the distributor sends a "stop" pulse to the modulator to shift the carrier to its space frequency for a predetermined interval which is slightly longer than the interval of the previous individual pulses. The carrier is then returned to its mark frequency for a predetermined interval before the next character is transmitted.

The present invention includes an inter-coupled system which permits the information on information storage cards, for example, of the punched type, to be introduced directly into the teletypewriter system to be subsequently reproduced as a printed record at one or more remote teletypewriter stations. The receiver portion at the local station may also be used to monitor and provide a printed record of the information from the storage cards which is being transmitted.

The invention will be described in conjunction with the International Business Machine type of punched information storage cards as punched and read by an International Business Machine 024 or 026 type of key punch. It will be apparent to those skilled in the art, however, that other types of information storage elements and other appropriate sensing units may be substituted for the particular cards and unit to be described. Moreover, the system of the present invention will be described in conjunction with a Teletype Model 28KSR or Model 28RO teletypewriter mechanism. It will become apparent, however, as the present description proceeds, that the concepts of the present invention may be applied to other types of teletypewriter systems and mechanism.

In the International Business Machine type of information storage cards, the information is recorded in the form of patterns of punched holes. Each card is divided, for example, into one or more imaginary "fields," with each field including a predetermined number of adjacent columns. The number of columns on the card may vary from field to field. Each of the columns corresponds to a different position of the card, as the card is shifted through a key punch or through a card sensing mechanism. The fields are defined by a program card which is mounted on an auxiliary drum in the key punch or reading mechanism, and a different program card may be used for different sets of information storage cards to be processed.

Each of the columns referred to in the preceding paragraph may represent, for example, a series of ordinal levels extending from 0–9. The location of a punch in any particular column represents a digit of from 0–9, depending upon the ordinal level in the column at which the particular punch is located. Adjacent columns in each field may represent digits of varying ordinal significance. In this manner, a multi-digit number may be represented in each field by a pattern of punchings in the respective columns in that particular field.

The punched type of information storage card, such as described above, may also be used to represent alpha-numeric information. For that purpose, it is usual to provide additional ordinal levels in each column, which may be represented, for example, by the digits 11 and 12. Then, a punch in any one of the 0, 11 or 12 levels in any column in conjunction with a punch at any one of the 1–9 levels in that column can be used to designate a particular letter. This type of coding will be described in detail subsequently.

The International Business Machine key punch mechanisms referred to above are suitable for recording data on the punched type of information storage card, and of sensing data already recorded on such cards. A typical key punch includes a keyboard, or other input control means, which permits information to be introduced into the key punch for recording on successive ones of a series of blank cards which are successively fed through the key punch.

Alpha-numeric or numeric information is recorded on the cards by the key punch in the form of the different hole patterns at the various levels in the columns of the different fields of each card, as described above. The information storage cards discussed in the preceding paragraph are capable of storing information for a wide range of different uses. For example, the information stored on such cards may represent inventories maintained in various departments of the more complex type of business organizations. Moreover, these cards may be used to store payroll information, and other accounting data.

The International Business Machine card sensing mechanism referred to above is capable of sensing, or reading, the punch patterns on successive ones of the information storage cards, and of transforming the punch patterns into equivalent output signals. It is usual for such card reading mechanisms to include a plurality of output terminals, and the location of one or more punches in the column of a particular card being read at any particular instant is represented by a change in the potential of the output terminal, or terminals, corresponding to that position, or positions. A combined key punch and card reading mechanism of the type described above is illustrated and described, for example, in United States Patent 2,684,719 which issued July 27, 1954 in the name of R. B. Johnson et al.

The apparatus and system of the present invention is advantageous in that it permits information recorded and stored on information storage cards, such as the punched type described in the preceding paragraphs, to be quickly and readily transposed into a decoded printed and easily understandable record. More than that, the system and apparatus of the invention permits such a transposition to be made either locally at the station at which the information storage cards are being read, or instantaneously at one or more remote stations to which the transposed information is being transmitted.

The system and apparatus of the present invention is capable, for example, of introducing information from the columns of a usual punched information storage card into a teletypewriter system without special programming, and this information may be numeric or alpha-numeric, or mixed. That is, an operator may, if he chooses, introduce into the teletypewriter system the data from a number of information storage cards in sequence, each of which cards may have different alpha-numeric and numeric field and column locations.

In the embodiment of the invention to be described, a high degree of flexibility is achieved in that any field or column of a card may be skipped, and any column may be used to generate special codes such as "carriage return," "space," and so on.

The invention is also advantageous in that the inter-coupled apparatus constructed in accordance with the concepts of the invention is relatively simple to operate and install.

The inter-coupler unit of the invention may be used to inter-couple commercially available card sensing mechanisms to commercially available teletypewriter systems, as noted above. Moreover, this inter-coupling is achieved with a minimum of disturbance to the internal components of the card sensing mechanism or teletypewriter system. When information from the card sensing mechanism is to be transmitted by the teletypewriter system, it is merely necessary for the operator to cause cards to be fed through the card sensing machine in usual manner, and the information on the cards is automatically transmitted by the teletypewriter system.

It should be reiterated, that no special coding is required for the information storage cards. The inter-coupled apparatus and system of the invention serves to transpose the usual punched card alpha and numeric codes into the usual teletypewriter alpha-numeric and numeric codes. This means that any type of information storage card on which information is recorded in accordance with present-day standard codes may be introduced to the inter-coupled apparatus and system of the invention, and such a card may have its information directly decoded and reproduced in printed form by the teletypewriter receivers.

In the drawings:

FIGURE 1 is a table representing the present-day standard alpha and numeric code for the International Business Machine punched information storage card, and also showing the present-day standard 5-unit permutation code for the same figures and letters;

Figure 2A:
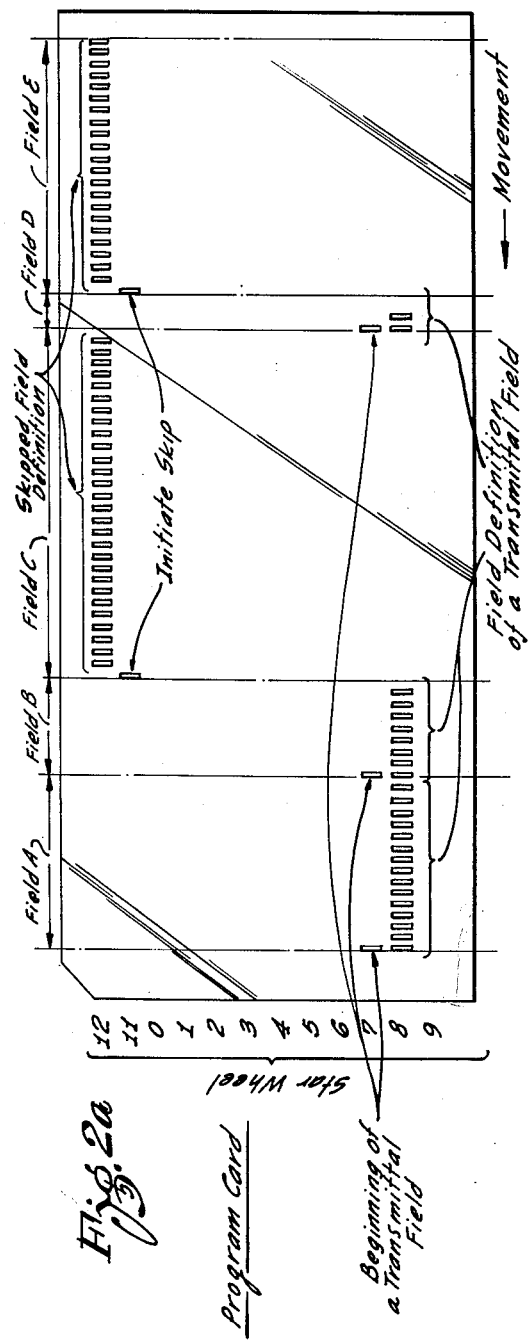
FIGURE 2a illustrates a typical International Business Machine program card which is used to set up the field program for each of a group of information storage cards to be processed and to control the column-by-column processing of such cards, the illustrated program card defining certain fields which are to be processed, and also defining certain other fields which are to be skipped.
Figure 2B:
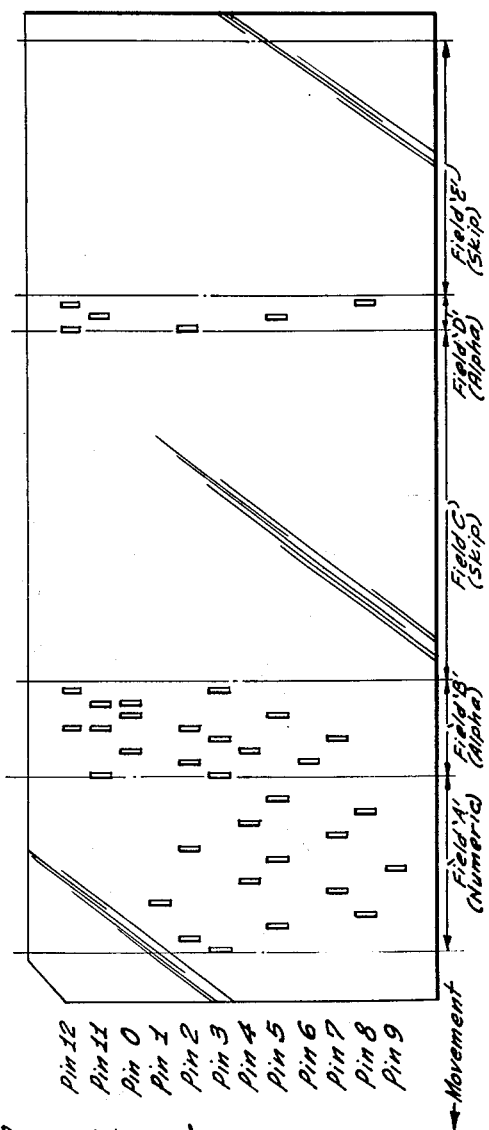
FIGURE 2b illustrates a typical International Business Machine information storage card, having imaginary fields defined by the program card of FIGURE 2a, with each field including a plurality of columns and with each column having a plurality of digital levels extending from 0–12.
Figure 3:
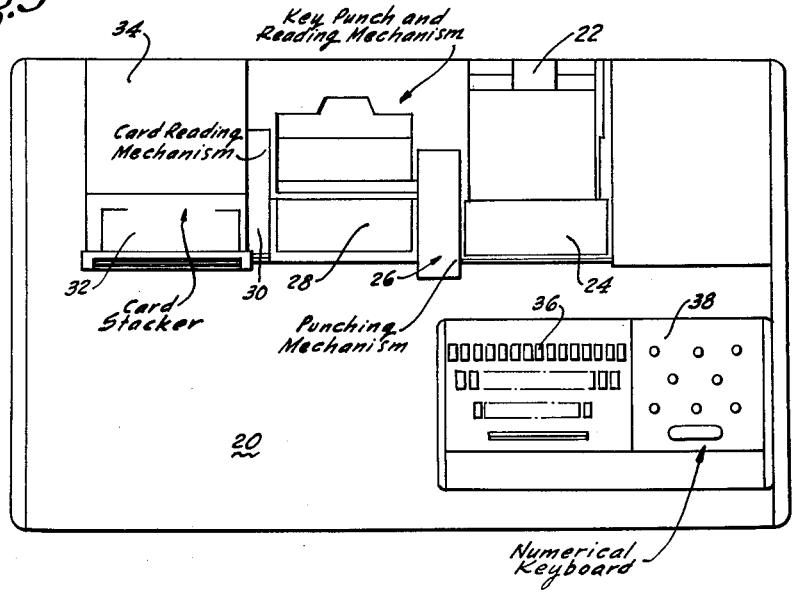
Figure 4:
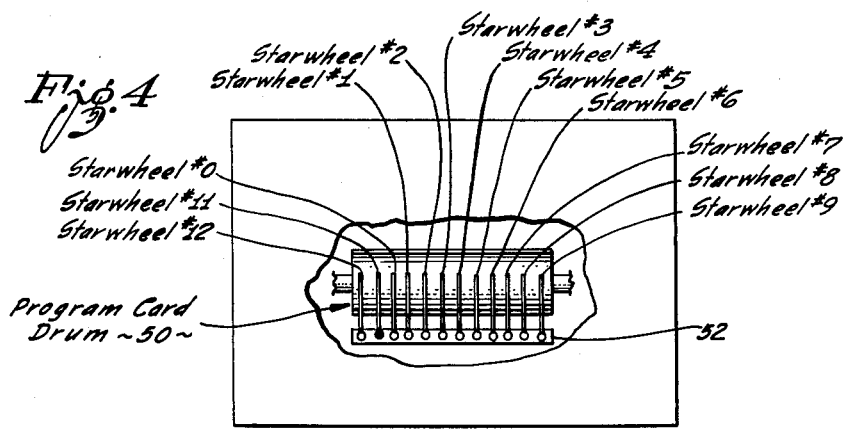
Figure 5:
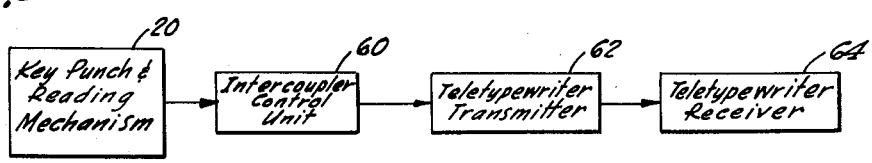

FIGURE 3 is a top plan view of a typical combined key punch reading mechanism for punched information storage cards, such as the information storage card of FIGURE 2b, the representation of the key punch and reading mechanism being somewhat schematic in form and illustrating the different components of the mechanism which enable successive information storage cards to be punched in accordance with information to be recorded on them, and which causes the cards subsequently to be sensed so that the recorded information may be read and converted into electrical signals;

FIGURE 4 is a fragmentary view of one of the internal components of the key punch and card reading mechanism of FIGURE 3, the illustrated components including an auxiliary program drum and certain star wheel switches associated with the drum, the auxiliary program drum serving as a transport for the program card of FIGURE 2a and the illustrated assembly being used for control and timing purposes;

FIGURE 5 is a block diagram of the inter-coupled apparatus of the present invention, this diagram illustrating the major components of the apparatus and system and which are inter-coupled in a manner to be described;

FIGURES 6, 7 and 8 are circuit diagrams which together constitute suitable circuitry for receiving the output signals from the card sensing mechanism and for converting such signals into a code suitable for actuating a teletypewriter system; and FIGURE 9 is a schematic representation explaining certain symbols used in a matrix network included in the circuitry of FIGURE 8.

One of the functions of the inter-coupling unit which is incorporated into the apparatus and system of the present invention is to transpose the usual punched card code into a code suitable for use in a teletypewriter system. As described above, and as shown by the table of FIGURE 1, the various letters of the alphabet are represented by pairs of punches in the different columns of the typical punched type of information storage card. As shown in FIGURE 1, a group of letters A–I are designated by a punch at the digit level 12 in a particular column, and the individual letters within the group are distinguished by punches at the different digit levels 1–9. In like manner, the group of letters J–R are identified by a punch at the digit level 11 in any particular column, and the individual letters within that group are designated by additional punches at the digit levels 1–9. Finally, the group of letters S–Z are represented by a punch at the digit level 0 in a particular column, and individual letters in the group are represented by additional punches at the digit levels 2–9. In the absence of additional punches at the 0, 11 or 12 digit levels in any particular column, that column represents numeric information, and the particular digit represented is identified by a punch at a corresponding selected digit level in accordance with a code sequence such as shown in FIGURE 1.

As mentioned above, and as illustrated in FIGURE 1, the different letters in the table of FIGURE 1 are represented in the teletypewriter system by a 5-unit permutation code. Each of the 5 units of the code may have one of two values, and these values are controlled so that the different letters may be represented.

As shown in the table of FIGURE 1, each unit of the teletypewriter code is represented by an impulse which has a duration of, for example, 22 milliseconds at a standard transmitting speed of 60 words a minute. When a particular impulse has a value represented by a shaded rectangle in the illustrated table, the transmitted teletypewriter carrier is shifted to its "space" frequency, and when any impulse has a value represented by an unshaded rectangle in the illustrated table, the carrier is shifted to its "mark" frequency. Therefore, the letter "A," for example, is represented by a serial modulation of the transmitted carrier in accordance with a space, space, mark, mark, mark sequence. As noted above, the carrier is controlled to its space frequency for a slightly longer interval at the end of each character, this interval extending, for example, for 31 milliseconds. Likewise, the carrier is returned to its mark frequency before the beginning of each character for an interval of 22 milliseconds.

As also illustrated in the table of FIGURE 1, the teletypewriter system includes certain functional codes. For example, the code space, space, space, mark, space transmitted to a receiver causes the carriage at the receiver typewriter to be returned to its start position so that the next line may be started. Likewise, a code of space, space, space, mark, space produces a one character shift of the carriage at the teletypewriter receiver. The code mark, mark, mark, mark, mark provides a "letters shift" at the receiver teletypewriter, so that all the following code characters represent respectively the letters in the letters column of FIGURE 1. This continues until a code of mark, mark, space, mark, mark is received to designate a "figure shift." Then, all the succeeding codes represent the characters in respective ones of the figures column in FIGURE 1.

As noted above, the program card of FIGURE 2a defines the different fields on the information cards which are to be processed, and those which are to be skipped. As illustrated in FIGURE 2a, a punch in the 7 digit position represents the biginning of a transmittal field. Then, each column in the transmittal field is defined by punches in the 8 digit position. Two of the transmittal fields are designated as field "A" and field "B." Field "C" on the program card of FIGURE 2a is a skipped field, and that field is represented by a punch at the 11 digit position in the first column of the field. Then, each succeeding column in the skipped field is designated by a punch in the 12 digit position.

The field following the skipped field "C" is designated field "D," and the latter field is a transmittal field as designated by a punch in the 7 digit position of the first column. The field "D" includes three columns, these being designated by respective punches at the 8 digit position. The program card of FIGURE 2a also includes a skipped field "E." The skip operation for the latter field is initiated by a punch at the 11 digit position, and each succeeding column in the skipped field is designated by punches in the 12 digit position.

As noted above, a typical information storage card is illustrated in FIGURE 2b. The field definitions of the information card are controlled by the program card described above. As mentioned, the fields "C" and "E" are both skip fields. The field "A" of the information card of FIGURE 2b is a numeric field, this being represented by the absence of punchings in the 0, 11 or 12 digit positions in any column of that field. It should be noted that any column or columns in field "A" may be transposed to an alpha column, merely by incorporating appropriate punches at the 0, 11 or 12 digit positions in that field. The field "B" of the information storage card of FIGURE 2b is designated as an alpha field, with the different letters being represented in the various columns of that field by punches in the 0, 11 or 12 digit positions, and in the 1–9 digit positions. Likewise, the field "D" is designated an alpha field, this being so because of the additional punches in the 11 and 12 digit positions in that field.

The movement of the cards in FIGURES 2a and 2b is from right to left. It will be appreciated that the program card of FIGURE 2a passes through the key punch and reading mechanism shown in FIGURE 3 concurrently with a succession of information storage cards, such as the information card of FIGURE 2b. It is usual for the program card to precede each information card through the mechanism by one column, so that the appropriate controls may be set up. It is also evident, that additional punch codes may be interposed in any column of the information card, for initiating special teletypewriter functions, such as carriage return, space, and so on.

The information storage card of FIGURE 2b, and others like it, may be punched and subsequently sensed by the key punch and card reading mechanism of FIGURE 3, under the control of the program card of FIGURE 2a, as mentioned above. The mechanism of FIGURE 3 may be similar in all respects to the apparatus described in the Patent 2,684,719 referred to above. For that reason, a detailed description of the key punch and card sensing mechanism will not be included in the present specification. However, the mechanism will be described in sufficient detail to provide a clear understanding as to how it may be coupled into the inter-coupled apparatus and system of the present invention.

The key punch and card reading mechanism of FIGURE 3 is represented generally as 20. Black information storage cards, similar to the card of FIGURE 2b, are fed into a hopper 22 in the mechanism of FIGURE 2. The black cards from the hopper 22 are then fed in succession to a carriage 24 upon the operation of the machine. The cards in the carriage 24 are carried in a direction towards the left in FIGURE 3 through card punching mechanism which is indicated as 26.

The information storage cards are moved in a step-by-step manner through the mechanism of FIGURE 3 under the control of the program card of FIGURE 2a. The apparatus includes keyboards 36 and 38 which enable the successive information cards to be punched in accordance with the data to be stored on the individual cards. The keyboard 36 provides the alpha punchings in accordance with the code described above, and the keyboard 38 provides the numeric punchings. The key punch mechanism of FIGURE 3 may be controlled by other instrumentalities, if so desired, such as described in copending application Serial No. 608,344 filed September 6, 1956, now Patent No. 2,992,772 in the name of Glenn E. Hagen, and in copending application Serial No. 674,766 filed July 29, 1957, now Patent No. 2,998,912 in the name of Glenn E. Hagen.

After each information storage card has passed through the punching mechanism 26 and has received the data to be recorded on it, the card is moved into a carriage 28. The carriage 28 then carries the punched cards in succession through a card reading mechanism 30 and deposits the cards successively into a card stacker 32. The card stacker 32 serves to stack the cards into an appropriate holder 34. The cards stacked in the holder 34, therefore, are all punched in accordance with the alpha-numeric or numeric information which is recorded on the different cards.

The card reading mechanism 30 provides electrical output signals representative of the punch positions in the successive columns of each field of the information cards passed through it. The reading mechanism 30 is provided with a plurality of output terminals respectively corresponding to the 0–12 digit positions of each column of each card passed through the sensing mechanism. Then, the potential value at different ones of these output terminals changes in accordance with the location of the punchings in the different columns. These output terminals, in accordance with the present invention, are connected to an inter-coupler control unit, which serves to transform the output signals into a code appropriate for use in teletypewriter systems.

A program card drum 50 (FIGURE 4) is included in the key punch and card reading mechanism 20. The drum 50 is driven in synchronism with the movement of each card through the card reading mechanism 30. The program card of FIGURE 2a is fastened to the peripheral surface of the drum 50 of FIGURE 4, and this card is rotated on the drum in synchronism with the movements of each information storage card through the key punch and card reading mechanism 20.

A series of aligned star wheel switches designated star wheel switch No. 1 etc. . . . star wheel switch No. 12 are mounted on a block 52 in spaced parallel relationship. These star wheel switches are adapted to ride adjacent one another on the surface of the program card of FIGURE 2a when that card is positioned on the drum 50. The arrangement is such that each of the star wheel switches rides along the surface of the auxiliary program card on the drum, with each switch having a rotatable star wheel portion engaging a different track on that surface. These tracks correspond respectively to the different digit levels on the program card, as shown in FIGURE 2a.

Whenever a star wheel moves into a punch in its corresponding track, its associated switch portion closes. The assembly of FIGURE 4, therefore, provides a switching system in which individual ones of a bank of star wheel switches may be selectively closed and opened by the program card in synchronism with the movement of each of the information storage cards through the card reading mechanism 30. Such switches are described in greater detail, for example, in the copending application Serial No. 674,766 referred to above.

It will be evident from the foregoing description, that the opening and closing of the No. 12 star wheel switch will represent a skipped field definition, whereas the closing of the No. 11 star wheel switch will designate the initiation of a skipped field. Likewise, the closing of the No. 7 star wheel switch will represent the beginning of a transmittal field, and the opening and closing of the No. 8 star wheel switch will represent the field definition of each transmittal field.

As illustrated in the block diagram of FIGURE 5, the key punch and reading mechanism 20 has its output terminals, as described above, connected to an inter-coupler control unit 60. This control unit, as mentioned above, responds to the output signals from the key punch and reading mechanism 20 to convert those signals into an appropriate code for operating a teletypewriter transmitter. The inter-coupler unit 60, accordingly, is connected to a teletypewriter transmitter 62. The transmitter 62 produces, for example, a high frequency alternating current carrier wave. This carrier wave is frequency modulated between a "mark" frequency and a "space" frequency in a manner to be described. The resulting modulated high frequency is transmitted to one or more teletypewriter receivers 64. This transmission, of course, may be made over any suitable medium, such as telegraph wires or by wireless telegraphy.

The circuitry involved in the inter-coupler unit 60 of FIGURE 5, and the manner in which that circuitry is connected to the key punch mechanism 20 and into the teletypewriter transmitter 62, is illustrated in FIGURES 6–8.

As shown in FIGURE 6, a plurality of pins numbered pin 1 to pin 12, are included in the key punch reading mechanism 30 of FIGURE 3. As each column of the information storage card of FIGURE 2b is being processed, one or more of these pins closes in conformance with the location of one or more of punches in that column at the different digit positions.

As noted above, FIGURES 6, 7 and 8 are circuit diagrams which together constitute suitable circuitry for receiving the output signals from the card sensing mechanism 30 and for converting the signals into a code suitable for actuating the teletypewriter transmitter 62.

The code sensing mechanism 30 of FIGURE 3 includes a series of pins which are selectively closed, as the card processed through the mechanism presents punches to the pins in its different rows. These pins are numbered 1–12 in FIGURE 6. The pins 1–12 serve to energize respective relays L1–L12. The pins 10–12 also serve to energize respective relays L13, L14 and L15. These latter relays close corresponding holding contacts L13, L14 and L15 in the energizing circuits of the relays L10, L11 and L12.

The circuit of FIGURE 6 includes an output terminal A which is connected to a similarly designated terminal in the circuit diagram of FIGURE 7. This output terminal is connected to one side of the energizing coil of a relay L16. The other side of that energizing coil, together with the energizing coils of the relays L1–L15, are connected to the positive terminal of the 150 volt direct voltage source. The circuit diagram of FIGURE 6 also includes a terminal B which is connected to a similarly designated terminal in the circuit diagram of FIGURE 7. The terminal B is connected to each of a plurality of resistors 100, 101, 102, 103, 104, 105, 106, 107, 108, 109, 110, and 111. The resistors 100–108 are connected respectively to the other side of the energizing coils of the relays L1–L9. The resistors 109, 110 and 111 are connected to the other side of the energizing coils of respective ones of the relays L13, L14 and L15. The pins 1–12 have their armatures connected to a common lead which extends to a terminal C. This terminal is connected to a similarly designated terminal in the circuit diagram of FIGURE 7.

It should be pointed out at this time, that the contacts illustrated in FIGURES 7 and 8 are in their de-energized condition. It should also be pointed out that the relay contacts throughout the diagram and the corresponding relay energizing coil are designated by the same numbers.

The circuit diagram of FIGURE 7 includes a relay L23 which has its energizing coil connected to the positive terminal of a 150 volt direct voltage source and to the armature 1 of a pair of relay contacts L25 (1–4). The energizing coil of the relay L23 is also connected to a resistor 120 having a value, for example, of 47 kilo-ohms. This resistor is connected to a normally closed contact 4 of a pair of relay contacts L24 (1–4).

FIGURE 7 also includes a group of relay contacts L1–L13. These contacts are connected in the manner illustrated at the top of FIGURE 7 to form a relay tree. The relay tree is connected to the normally open contact 3 of a pair of relay contacts L60 (1–3). The armature 1 of that pair is connected to a grounded capacitor 122. This capacitor may have a capacity of 2.0 microfarads. A normally closed contact 4 associated with the armature 1 of the relay contacts L60 (1–4) is connected to a grounded resistor 124. This resistor may have a resistance, for example, of 1 kilo-ohm.

The armature 1 of the pair of relay contacts L25 (1–4) is associated with a normally closed fixed contact 4 of that pair, and the fixed contact 4 is connected to one terminal of the energizing coil of a relay L27. The other terminal of this energizing coil, together with one terminal of all the relay coils of a group designated L24, L25, L26, L28, L29, L30, L31, L32, L60, L34, L35, L36, L37, L38, L39 and L40 are connected to the positive terminal of a 150 volt direct voltage source.

The energizing coil of the relay L24 is connected to the relay tree referred to above and to a resistor 126 having a resistance of 47 kilo-ohms, for example. This energizing coil is also connected to the armature 1 of a pair of relay contacts L26 (1–4). A normally closed contact 4 associated with that armature is also connected to the relay L27 and to a resistor 128. The resistor 128 may have a resistance of 47 kilo-ohms, for example. This resistor is connected to a normally closed contact 4 of a pair of contacts L63 (4–1). The armature 1 associated with that normally closed contact is grounded.

The relay L25 is connected to a normally open contact 3 of a group of contacts L23 (1–3). A normally closed contact 4 of the relay contacts L23 (1–4) is connected to the resistor 126, and the armature 1 of the group is connected to the armature 1 of a pair of contacts L24 (1–4). A normally closed contact 4 of the latter pair is connected to the resistor 120, and a normally open contact 3 of a pair of relay contacts L24 (1–3) is connected to the relay L26.

The relay energizing coil L28 is connected to a normally closed contact 5 of a pair of relay contacts L29 (5–8), to a normally open contact 6 of a group of a pair of relay contacts L16 (6–8) and to a normally open contact 3 of a pair of relay contacts L57 (3–1). The armature 8 of the pair of relay contacts L29 (6–8) is connected back to a resistor 130 and to a normally open contact 6 of a pair of relay contacts L22 (6–8). The resistor 130 may have a resistance of 10 kilo-ohms, and it is connected to the energizing coil of a relay L29.

It should be stated at this point, that isolating diodes are included in the circuit diagram of FIGURES 6 and 7, but these shall not be referred to specifically in the following description:

The normally closed contact 5 of the pair of relay contacts L29 (6–8) is also connected to the energizing coil of the relay L31 and to a normally open contact 3 of a pair of relay contacts L36 (1–3).

The armature 8 of the pair of relay contacts L22 (6–8) is connected to a normally open contact 6 of a pair of relay contacts L44 (6–8) and to a resistor 136. The resistor 136 may have a resistance of 47 kilo-ohms, and it is connected to the energizing coil of the relay L29. The energizing coil of the relay L30 is connected to a normally closed contact 5 of a pair of relay contacts L44 (8–5), the armature of that group being grounded.

The energizing coils of the relays L31 and L32 are connected to the armature 1 of a pair of relay contacts L29 (8–6) and to a normally open contact 6 of a pair of relay contacts L27 (8–6). The relay contacts L29 (1–4) include a normally closed fixed contact 4 which is connected to the armature 1 of a pair of relay contacts L27 (1–4). A normally closed contact 5 of the pair of relay contacts L22 is connected to a normally open contact 5 of a group of relay contacts L53 in the circuit diagram of FIGURE 8.

The energizing coil of the relay L60 is connected to a normally open contact 3 of a pair of relay contacts L16 (3–1) and to a normally open contact 6 of a pair of relay contacts L32 (8–6). The armature 8 of the pair of relay contacts L32 (8–6) is connected to a resistor 136 which may have a resistance of 47 kilo-ohms. The energizing coil of the relay L31 is further connected to a grounded resistor 138 which may have a resistance of 33 kilo-ohms.

The energizing coil of the relay L34 is connected to a normally open contact 3 of a pair of relay contacts L46 (3–1) and to a resistor 140. The resistor 140 may have a resistance, for example, of 47 kilo-ohms. The armature 1 of the relay contacts L46 is connected to a normally closed contact 4 of a pair of relay contacts L16 (4–1).

The resistor 140 is connected to the armature 8 of a group of relay contacts L54.

The energizing coil of the relay L35 is connected to a normally open contact 3 of a pair of relay contacts L40 (3–1). The armature 1 of that pair is connected to a normally closed contact 5 of a pair of relay contacts L41 (8–5). The armature 8 of that group is grounded.

The armature of the pair of relay contacts L36 (1–3) is connected to a normally closed contact 4 of a pair of relay contacts L42 (4–1) and to the armature 8 of a pair of relay contacts L34 (8–6). A normally open contact 3 of the pair of relay contacts L42 (1–3) is connected to the energizing coil of the relay L36. A normally open contact 6 of the pair of relay contacts L34 (6–8) is connected to the energizing coil of the relay L37 and to the terminal A which connects with the circuit diagram of FIGURE 6.

The energizing coil of the relay L38 is connected to a normally open contact 3 of a pair of relay contacts L27 (3–1). The armature 1 of that pair is connected to an output terminal E which connects with the circuit diagram of FIGURE 8, a normally closed contact 4 of the pair of relay contacts L29 (1–4), and a normally open contact 6 of a pair of relay contacts L42 (8–6). The armature 8 of the latter pair of relay contacts is grounded. The energizing coil of the relay L38 is also connected to a terminal G which extends to a like terminal in the circuit diagram of FIGURE 8.

The energizing coil of the relay L39 is connected to a resistor 142 which may have a resistance, for example, of 47 kilo-ohms. The resistor 142 is connected to a normally open contact 6 of a pair of relay contacts L39 (8–6). The armature 8 of that pair is connected to an output terminal H which extends to a similarly designated terminal of the circuit diagram of FIGURE 8. The armature 8 of the pair of relay contacts L39 is connected to a normally closed contact 5 of a pair of relay contacts L42 (5–8), and to an output terminal designated H which extends to a like terminal in the circuit diagram of FIGURE 8, and also to the armature 1 of a pair of relay contacts L38 (1–3). The armature 8 of the pair of relay contacts L42 (5–8) is grounded. The latter armature is also associated with a normally open contact 6 which is connected to the normally closed contact 4 of the pair L29 (1–4).

The energizing coil of the relay L40 is connected to a normally closed contact 4 of a pair L31 (1–4), and to an output terminal D which is connected to a similar terminal of the circuit diagram of FIGURE 8. The pair of relay contacts L39 (8–5) includes a normally closed contact 5 which is connected to a normally closed contact 4 of a pair of relay contacts L32 (4–1). The armature 1 of the latter pair is connected to the armature 1 of a pair of contacts L45 (1–3). The pair of contacts L45 includes a normally open contact 3 which is connected to the escapement control in the key punch mechanism 20 of FIGURE 1.

The pair of relay contacts L38 (5–8) includes a normally closed contact 5 which is connected to the terminal B. This terminal is connected to the similarly designated terminal in the circuit diagram of FIGURE 6. The pair of relay contacts L54 (5–6) includes a normally closed contact 5. This contact is connected to a normally closed contact 4 of a pair of relay contacts L22 (4–1) and to an output terminal J. This latter output terminal is connected to a similar terminal in the circuit diagram of FIGURE 8. The armature 1 of the relay contacts L22 is grounded. The pair of relay contacts L54 (6–8) includes a normally open contact 6. This latter contact is connected to a normally closed contact 5 of the pair of relay contacts L38 (5–8) and to the terminal B. This terminal, as mentioned above, is connected to a similarly designated terminal in the circuit diagram of FIGURE 6.

The relay contacts L29 (6–8) includes a normally open contact 6 which is connected to the energizing coil of a relay L54 and to a resistor 146. The resistor 146 may have a resistance of 47 kilo-ohms. The resistor 136 and the armature 1 of the relay contacts L37 are connected to the other terminal of this resistor, to a further resistor 148, and to the energizing coil of a relay L55. The resistor 148 may have a resistance of 47 kilo-ohms, and it is connected to the energizing coil of a relay L56. The energizing coils of the relays L54, L55 and L56 are all connected to the positive terminal of the 150 volt direct voltage source. The energizing coil of the relay L56 is also connected to a resistor 150. This latter resistor may have a resistance of 10 kilo-ohms, and it is connected to a normally closed contact 4 of a group of relay contacts L55. The armature 1 of that group is grounded.

The resistor 136 and the armature 1 of the relay contacts L37 (1–4) are also connected to the armature of a cam operated switch Tc which is located in a distributor 152 included in the system of FIGURE 7. The switch Tc includes a contact which is connected to the energizing coil of a relay L59 and to the energizing coil of a relay L42. The former energizing coil is directly connected to the positive terminal of the 150 volt direct voltage source, and the latter energizing coil is connected to that terminal by way of a resistor 154 which may have a resistance of 4.7 kilo-ohms.

The armature 8 of the relay contacts L16 (6–8) and the armature 1 of the relay contacts L57 (3–1) are connected to a normally open contact 3 of a pair of relay contacts L59 (1–3) and to the energizing coil of a relay L41. The armature 1 of the relay contacts L59 is grounded, and the energizing coil of the relay L41 is connected to the positive terminal of the 150 volt direct voltage source.

The resistor 136 and the armature 1 of the relay contacts L37 (1–4) are further connected to the armature 1 of a pair of relay contacts L41 (4–1). A normally open contact 3 of the pair of relay contacts L55 (3–1) is also connected to that armature and to a normally closed contact 4 of a pair of relay contacts L30 (4–1). The armature of the latter pair of relay contacts is grounded. The relay contacts L41 (4–1) include a normally closed contact 4 which connects with a terminal F. This terminal is connected to a similarly designated terminal in the circuitry of FIGURE 8.

The energizing coil of the relay L39 is also connected to a normally open contact 3 of a pair of relay contacts L44 (1–3), to the energizing coil of a relay L45, to the energizing coil of a relay L46, and to the terminal C. This terminal C connects with the similarly designated terminal of the circuitry of FIGURE 6. The armature 1 of the relay contacts L44 (1–3) is connected to the fixed contact of a cam operated switch P5 in the key punch mechanism 20 of FIGURE 1. The armature of that switch is grounded. The energizing coil of the relay L45, and the energizing coils of a pair of relays L44 and L63 are all connected to the positive terminal of a 150 volt direct voltage source. The energizing coil of the relay L44 is connected to the anode of a vacuum tube V1 and to a resistor 160. The resistor 160 has a resistance, for example, of 47 kilo-ohms and it is connected to the energizing coil of the relay L45.

The tube V1 has a screen grid which is connected to a resistor 162, the resistor being connected back to the anode of the tube and having a value of 4.7 kilo-ohms, for example. The control grid of the tube V1 is connected to a resistor 164, and the cathode is connected to a normally open contact 3 of a pair of relay contacts L56. The armature 1 of those contacts is grounded. The resistor 164 may have a resistance of 4.7 kilo-ohms, and it is connected to a normally closed contact 4 of a pair of relay contacts L58 (4–1), and to a resistor 166. The resistor 166 may have a resistance of 4 kilo-ohms, and it is connected to the positive terminal of a 49 volt direct voltage source, the negative terminal of that source being grounded. The armature 1 of the relay contacts L58 is connected to the No. 8 star wheel switch of FIGURE 4.

The system of FIGURE 7 also includes a vacuum tube V2. The anode of the tube V2 is connected to the punch clutch of the key punch mechanism 20 of FIGURE 1. The screen grid of the tube V2 is connected through a 4.7 kilo-ohm resistor 168 to the anode. The control grid of the tube is connected to a 4.7 kilo-ohm resistor 170 which, in turn, is connected to a resistor 172 and to a normally closed contact 5 associated with a pair of relay contacts L58 (5–8). The resistor 172 may have a resistance of 3 kilo-ohms, and it also is connected to the positive terminal of the 49 volt direct voltage source. The armature 8 of the relay contacts L58 (5–8) is connected to the No. 7 star wheel switch in FIGURE 4.

The cathode of the tube V2 is connected to a normally open contact 5 of a pair of relay contacts L45 (5–8). The armature 8 of that pair is connected to a normally open contact 6 of a pair of relay contacts L56 (6–8). The armature 8 of the latter pair is connected to a normally closed contact 5 of a pair of relay contacts L47 (5–8). A normally open contact 6 of the pair L47 (6–8) is connected to the normally closed contact 4 of the relay contacts L58 (4–1). The armature 8 of the relay contacts L47 (5–8) is connected to a normally closed contact 4 of a pair of relay contacts L53 (4–1). The armature 1 of the pair is grounded, and a normally open fixed contact 3 of which is also associated with the armature 1 is connected to a terminal K. The terminal K connects with a similarly designated terminal in the system of FIGURE 8.

The distributor 152 includes a distributor clutch magnet 179. When this clutch magnet is energized, the distributor is caused to sweep through an entire cycle. The clutch magnet of the distributor is connected to a resistor 180 which may have a value of 1 kilo-ohm, and which is connected to the positive terminal of the 150 volt direct voltage source. The distributor clutch magnet is also connected to a normally open contact 7 of a pair of relay contacts L28 (5–7). The armature 5 of that pair is grounded.

The armatures 8 of a group of relay contacts L17 (8–6), L18 (8–6), L19 (8–6), L20 (8–6) and L21 (8–6) and a "stop" connection of the distributor 152 are all connected to an output terminal Y. The normally open fixed contacts 6 of each of these pairs of relay contacts are connected to different terminals of the distributor, these being numbered 1–5. The armature 153 of the distributor is connected to an output terminal Z. The output terminals Y and Z are connected to a carrier generator and frequency modulator unit 182. The unit 182 is connected, for example, to the teletypewriter line which extends to one or more teletypewriter receivers.

The system of FIGURE 8 includes a group of relays L17, L18, L19, L20, L21 and L22. These relays are connected as a register, and are connected to the positive terminal of the 150 volt direct voltage source. A diode matrix 183 is connected to the energizing coils of the relays L17–L22. The diode matrix 183 of FIGURE 8 is a decoding matrix of known construction. Each circled point in the matrix includes a connecting diode 185 which is connected in the manner shown in FIGURE 9.

The diode matrix 183 is controlled by the relays L1–L12 associated with the correspondingly numbered pins in FIGURE 6. The relay contacts controlled by these relays assume different configurations as different letters and figures are represented by the numeric and alpha-numeric codes on the cards sensed by the pins in the card sensing mechanism of FIGURE 1. The figures and letters corresponding to the different configurations are set out along the bottom of the diode matrix 183 in FIGURE 8.

The letters shift lead (Ltrs) and figures shift lead (Figs) of the diode matrix 183 are controlled by the relay contacts L23 (8–6) and L24 (8–6) (as shown in FIGURE 8, and the "φ" lead of the matrix is connected to a normally closed contact 5 of a pair of relay contacts L14 (8–5). The armature 8 of that pair is connected to a normally closed contact 5 of a pair of relay contacts L15 (5–8). The armature 8 of the latter pair is connected to a normally closed contact 5 of a pair of relay contacts L26 (5–8). The armature 8 of the latter pair is connected to a normally open fixed contact T10 of a pair of relay contacts L10 (T10–C10). The armature C10 of that pair is connected, together with the armatures of a group of pairs of relay contacts L1 (1–3)–L9 (1–3), to the terminal D.

The terminal E is connected to an armature 8 of a pair of relay contacts L49 (8–6). A normally open contact 6 of that pair is connected to the energizing coil of a relay L50. The terminal E is also connected to the armature 1 of a pair of relay contacts L34 (1–3) and to a normally open contact 4 of a pair of relay contacts L54 (4–1). The normally open contact 3 of the first pair is connected to the "SP" lead of the matrix 183, and the armature 1 of the latter pair of relay contacts is grounded.

The terminal G is connected to the armature 8 of the relay contacts L23 (8–6) and to the armature 8 of the relay contacts L24 (8–6). The terminal H is connected to the armature 8 of a pair of relay contacts L51 (8–6). The fixed contact 6 of the latter pair is connected to the energizing coil of a relay L52.

The energizing coils of the relays L48 and L57 are connected to a normally open contact 4 of a pair of relay contacts L49 (4–1). The armature 1 of the latter pair is connected to a normally open contact 3 of a pair of relay contacts L47 (3–1). The armature 1 of the pair of relay contacts L47 is connected to the armature 8 of a pair of contacts L53 (8–5). The latter pair includes a normally open contact 5 which is connected back to the normally closed contact 5 of the relay contacts L22 in FIGURE 7.

The terminal J is connected to the armature 1 of a pair of relay contacts L51 (1–3). This pair includes a normally open contact 3 which is connected to the energizing coil of a relay L43 and to a resistor 190. This resistor may have a resistance of 47 kilo-ohms, and it is connected to the energizing coil of the relay L57 by way of a lead 192.

The terminal K is connected to the energizing coil of the relay L47 and to a resistor 194. This latter resistor may have a resistance of 47 kilo-ohms, and it also is connected to the lead 192. The lead 192 is further connected to the armature 1 of a pair of relay contacts L52 (1–4). This latter pair includes a normally open fixed contact 4 which is connected to ground.

A relay L49 has its energizing coil connected to a resistor 196, to a normally open contact 3 of a pair of relay contacts L48 (3–1), and to the lead CR of the diode matrix. The armature 1 of the pair of relay contacts L48 is grounded. The resistor 196 has a resistance of 47 kilo-ohms, for example, and it is connected to the lead 192.

The energizing coil of a relay L51 is connected to a resistor 198 which may have a resistance of 47 kilo-ohms, and which is connected to the lead 192. This energizing coil is also connected to a normally open contact 3 of a pair of relay contacts L50 (3–1) and to the armature 1 of a pair of relay contacts L43 (1–4). The armature 1 of the pair of relay contacts L50 is grounded, and the pair L43 has a normally open contact 4 which is connected to the LF lead of the diode matrix 183.

The key punch mechanism 30 of FIGURE 3 includes a card release switch and that switch is connected to the energizing coil of a relay L53.

The register relays L17–L21 are connected through respective holding contacts L17 (1–3)–L21 (1–3) and through respective resistors 200, 202, 204, 206 and 208 to the terminal F.

The relays L1–L9 of FIGURE 6 function as a buffer, and corresponding ones of these relays are energized when respective ones of the pins 1–9 in the card reading mechanism 20 of FIGURE 3 closes. It will be remembered that different ones of these pins close in accordance with the digit positions of the different punches in the processed information storage cards. As any one of the relays L1–L9 becomes energized, it remains energized after its corresponding pin opens. This is achieved through the respective holding resistors 100–109; and through the normally closed contacts L35 (5–8) (FIGURE 7), and through the contacts L44 (6–8) of FIGURE 7.

The relays L10–L12 of FIGURE 6 also function as a buffer, and corresponding ones of these latter relays are energized when respective ones of the pins 10–12 close. These latter relays remain energized after the corresponding pins open, this being achieved through respective pairs of the contacts L13 (1–3), L14 (1–3) and L15 (1–3). The relays L13, L14 and L15 are connected in the circuitry of FIGURE 6 so as to become energized in conjunction with the respective energizing of the relays L10, L11 and L12.

The relay L16 (FIGURE 6) functions as a common relay for the buffer, and it is energized when any one of the pins 1–12 closes.

The relays L17–L21 of FIGURE 8 function as a register under the control of the diode matrix. These relays are energized in different configurations by the matrix. The relays L17–L21 are energized through the matrix, through the buffer contacts under the matrix, through the contacts L31 (1–4) (FIGURE 7), L27 (1–4) (FIGURE 7) and L42 (6–8) (FIGURE 7). These relays then remain energized through individual holding circuits including their contacts L17 (1–3), L18 (1–3) . . ., and through a common holding circuit including the contact L41 (1–4) (FIGURE 7), and the contacts L30 (4–1) or L55 (1–3) or L44 (8–6).

The relay L22 functions as a common relay for the register formed by the relays L17–L21. The relay L22 is energized whenever any one of the register relays is energized, and it holds through the holding circuit described above.

The relay L23 is the "figures shift" relay, and it is energized through the buffer relay contacts whenever the contact being read from the processed information storage card is a figure rather than a letter. When that condition arises, the pins 10, 11 and 12 of FIGURE 6 are open, and the relay contacts L10 (c11–n11), L12 (c10–n10), L11 (c10–n10) (FIGURE 7) are all closed. The relay 23 is then energized through these contacts, and through any actuated one of the buffer contacts L1 (8–6), L2 (8–6) . . ., through the contacts L60 (3–1) and through the capacitor 122. The "figures shift" relay L23 is held energized through a holding circuit including the resistor 120, through the contacts L24 (1–4), L37 (1–4), L44 (6–8).

This means that whenever the "figures shift" relay L23 is energized during normal operation of the system, it remains energized until the "letters shift" relay L24 is energized to open the normally closed contacts L24 (1–4). The relay L24 is the "letters shift" relay and it is energized through the buffer relay contacts (11–L12) when a character being read from the processed information storage card is a letter. When this occurs, one of the pins 10, 11 or 12 in FIGURE 6 is closed (see FIGURE 1) and one of the corresponding relays L10, L11 or L12, and one of the corresponding relays L13, L14 or L15 is energized.

If the pin 10 is closed, the contacts L10 (t12–c12) are closed to permit the relay L24 to be energized through one of the contacts L1 (8–6), L2 (8–6) . . ., and through the contacts L60 (3–1) and the capacitor 122, when one of the pins 1–9 of FIGURE 6 closes. If the pin 11 is closed, the contacts L11 (c10–n10) close to permit the relay L24 to be energized through the circuit described above. Likewise, if the pin 12 is closed, the contacts L12 (c10–n10) close to permit the relay L24 to be energized through the normally closed contacts L11 (n10–c10) and through the circuit described above.

A holding circuit is formed for the "letters shift" relay L24 through the resistor 126, and through the contacts L23 (1–4), L37 (1–4) and L44 (6–8). Therefore, whenever the "letters shift" relay L24 is energized during normal operation of the system, it remains energized until the "figures shift" relay L23 is energized to open the normally closed contacts L23 (1–4).

The relay L25 is the "figures memory" relay. This relay is energized through the contacts L23 (1–3) and through the contacts L37 (1–4) and L44 (6–8). The relay L26 is the "letters memory" relay, and it is energized through the contacts L24 (1–3), and through the contacts L37 (1–4) and L44 (6–8). The relay L27 is the "figures/letters change" relay, and it is energized through the contacts L25 (1–4), through the diode 96 and through the same circuit as the relay L23; or through the contacts L26 (1–4), through the diode 97 and through the same circuit as the relay L24. This latter relay holds through a holding circuit formed by the resistor 128 and by the contacts L63 (1–4). This latter resistor has a value such that the relay L27 cannot be energized by the closed circuit including this resistor, but once energized the closed circuit holds the relay L27 in an energized state.

The relay L28 is the "distributor cycle" relay, and it is energized through the diode 98, through contacts L16 (6–8) or L57 (1–3), and through the contacts L59 (1–3); or it may be energized through the diode 99, the contacts L29 (5–8), the contacts L22 (6–8) and L44 (6–8). This relay controls the distributor clutch magnet 179 in the distributor 152. Each time the relay is energized the distributor armature 153 closes successively with its contacts 1, 2, 3, 4, 5 and "stop."

The relay L29 is the "clutch start" relay for the distributor. This relay is energized through the contacts L22 (6–8) and L44 (6–8). A holding circuit for the relay L29 is formed through the resistor 130 and the contacts L44 (6–8). The relay L59 is used to control the timing of the cycling of the register relays L17–L21 by the distributor under the control of the cam operated switch Tc of the distributor. The relay L59 is energized through the switch Tc and through the contacts L44 (8–6).

The relay L60 is used to delay the settings of the figures/letters circuit until all the relays (11–L16) in the buffer have been set. This relay is energized through the contacts L16 (1–3), the diode 133 and the contacts L44 (6–8). The relay L63 is a "limit reset" relay, and it is used to release the relay L47 so as to insure that only one figures or letters shift character is transmitted for each change in alpha-numeric/numeric. This relay is energized through the contacts L42 (B–5) and L38 (1–3).

The relay L30 is the "last field column hold" relay, and it is energized through the contacts L44 (5–8). This relay holds the register (17–L21) for the last column read from a field, when the field definition star wheel (No. 8, FIGURE 2a) has opened. The relay L31, on the other hand, prevents a transfer of information from the buffer relays (L1–L10) to the register relay when the figures/letters circuit is changed. This latter relay is energized through the diode 101, and through the contacts L27 (6–8). The relay L31 holds itself by resistor 138; and it is released through the contacts L36 (1–3) and the contacts L42 (4–1), or through the contacts L29 (5–8), L22 (6–8) and L44 (6–8).

The relay L32 is used to prevent a reading cycle in the key punch mechanism 20 of FIGURE 3 after reading the first card column or whenever the figures/letters circuit changes. This latter relay is energized through the same circuit as the relay L31, and it is held energized by a holding circuit formed by the resistor 136, the contacts L32 (8–6), the contacts L16 (3–1) and the contacts L44 (6–8).

The relay L34 is the "blank code generator" and this relay causes the diode matrix 183 of FIGURE 8 to generate the "space" code whenever a blank column is detected in the card being processed. This relay is energized through the contacts L46 (1–3), the contacts L16 (1–4) and L44 (6–8). The relay L34 holds through the resistor 140, and through the contacts L54 (6–8), L38 (8–5) and L44 (6–8).

The relay L35 is the "buffer hold" relay, and this relay is used to hold any character in the buffer L1–L12 until it is acceptable to the register L17–L21. The relay L35 is energized through the contacts L40 (1–3) and L41 (5–8). The relay L36 is the "transfer blockage release" relay and this latter relay releases the blocking circuit for transferring information from the buffer (L1–L12) to the register (L17–L21) after the distributor 152 has scanned the information in the register. The relay L36 is energized through the contacts L42 (1–3).

The relay L37 is the "figures/letters memory release or space" relay, and this relay is energized through the contacts L34 (6–8) and L42 (4–1). The relay L37 releases the figures and letters memory relays L25 and L26 whenever a space code is generated when a blank column is encountered in the card being processed.

The relay L38 is used to restore the buffer-register transfer circuit to normal after a figures or letters code has been generated, registered and scanned. The relay is energized through the contacts L27 (1–3) and L42 (6–8). The relay L39 prevents the key punch and reading mechanism 20 from going through more than one reading cycle at a time. The relay L39 is energized through the diode 112, through the contacts L44 (1–3) and through the cam operated switch P5 in the key punch mechanism. The relay L39 is held energized by a holding circuit formed by the resistor 142, and through the contacts L39 (8–6) and L42 (5–8).

The relay L40 is the "transfer" relay and it is used to hold the information in the buffer (L1–L12) until it has been transferred to the register (L17–L21). The relay L40 is energized through the diode 110, and through the contacts L31 (4–1), L27 (4–1) and L42 (6–8). The relay L41 is the "register hold" relay and it causes information to be held in the register (L17–L21) until it has been scanned by the distributor. This relay L41 is energized through the contacts L59 (1–3).

The relay L42 is the "transfer control" relay and it controls all information going into the register (L17–L21) with the exception of the "carriage return" code, line feed code and "space" code, if the last field column is a blank. The relay L42 is energized through the contacts L41 (8–6) when the distributor switch Tc opens, this being achieved by a connection from the top of the energizing coil of the relay L42 through the switch Tc and through the relay contacts L44 (8–6).

The relay L44 is the "field definition" relay. This relay is controlled by the No. 8 star wheel switch (FIGURE 4), as noted above, to be energized for each column position in a field to be sensed from the card being processed. This relay activates the system to receive numbers and letters information from the card being processed, and it also activates the system for the transmission of the "carriage return" and "letters/figures" codes. The relay L44 is energized through the discharge tube V1 and through the relay contacts L56 (1–3). The conductivity of the tube V1 is controlled by the relay contacts L58 (1–4) and by the No. 8 star wheel switch connected in its grid circuit, or by the relay contacts L47 (8–6) and L53 (1–4) which are also connected in its grid circuit.

The relay L45 serves to limit the key punch mechanism 20 (FIGURE 1) to one dummy punch cycle enabling the card reading mechanism 30 to read the first column of a field. The latter relay is energized through the contacts L44 (1–3) and through the cam operated switch P5. The relay 45 is held energized through a holding circuit formed by the resistor 160 and the tube V1.

The relay L46 serves as a follower for the cam operated switch P5 in the key punch mechanism 20 of FIGURE 1. This relay is used in conjunction with the buffer common relay L16 to detect a blank column on the card. The relay L46 is energized through the contacts L44 (1-3) and through the cam operated switch P5.

The relay L47 is the "carriage return/line feed start" relay, and it generates the "carriage return" code upon the release of a card. This relay is energized through the contacts L53 (1-3), and it is held energized through the resistor 194 and through the contacts L52 (4-1). The relay L48 is the "carriage return generate" relay and it is energized through the contacts L49 (4-1), L47 (3-1), L53 (8-5), L22 (5-8) and L44 (8-6). The relay L49 is the "carriage return follower" relay. The latter relay is energized through the contacts L48 (3-1). The relay L49 holds through the resistor 196 and through the contacts L52 (4-1).

The relay L50 is the "line field generate" relay, and it is energized through the contacts L49 (6-8) and L42 (6-8). The relay L51 is the "line feed follow" relay and it is energized through the contacts L50 (3-1). The relay L51 is held energized through a holding circuit formed by the resistor 198 and the contacts L52 (4-1).

The relay L52 is the "carriage return/line feed reset" relay and it is energized through the contacts L51 (6-8). The relay L53 is the "card release follow" relay, and it is energized from the terminal L which is connected to a card-release switch in the key punch mechanism 20 of FIGURE 3.

The relay L54 is used to insure registration of the "space" code when the first card column is blank. This relay is energized through the contacts L29 (8-6), L22 (8-6) and L44 (8-6). A holding circuit is formed for the relay L54 by the resistor 146 and the contacts L44 (8-6). The relay L55 insures that the distributor 152 has scanned the complete register (L17-L21) after reading the last field column before releasing the register. This relay is energized through the contacts L44 (6-8). The relay L56 is the "punch clutch control" relay and it insures that the distributor has scanned the last field column code and the register has released before reading a new field. The relay L56 is energized through the contacts L55 (1-4) and through the resistor 150, and the relay L56 is held energized through a holding circuit including the resistor 148 and the contacts L44 (6-8).

The relay L57 is the carriage return "line feed clutch control" relay and it operates the distributor clutch for transmitting the carriage return and line feed code. This relay is energized through the contacts L44 (6-8), L22 (5-8), L53 (8-5), L47 (1-3) and L-49 (1-4). The relay L57 is held energized by a holding circuit formed by the resistor 191 and by the contacts L52 (4-1).

The relay L58 is the "field definition cut-off" relay and it assures that a new card "start read" cycle will not begin until after the system has become stabilized after generating a carriage return/line feed code. This latter relay is energized through the contacts L57 (6-8).

When a card is brought into position in the key punch mechanism 30 of FIGURE 3 so that its first field column is ready to be read by the reading mechanism 30, the No. 7 star wheel switch of FIGURE 4 encounters a punch in the program card of FIGURE 2a which is supported on the drum 50, as described above. The tube V2 is then rendered conductive to energize the punch clutch in the key punch mechanism. This causes the first column of the first field of the information storage card of FIGURE 2b to be read by the card reading mechanism 30 of FIGURE 3. This action results in a corresponding one of the pins 1-12 of FIGURE 6 to be actuated, as selected by the position of the punch in that column.

However, the operations described above cannot be initiated unless the relay contacts in the grid and cathode circuits of the tube V2 are closed. These contacts include the contacts L53 (14), which must be closed to indicate that the previous card has been released from the card reading mechanism 30 of FIGURE 3; the contacts L45 (5-8), which must be closed to limit the key punch to one dummy cycle only; the contacts L56 (6-8), which must be closed to insure that the distributor has completed its scan of the register (L17-L21) to derive the information from the last column of the last field of the preceding card and that the register has been released; the contacts L47 (5-8), which must be closed to be sure that the carriage of the teletypewriter has been returned after the release of the previous card; and the contacts L53 (4-1), which must be closed also to indicate that the preceding card has been released.

After the first column of the first field of the card being processed has been read by the card reading mechanism 30 of FIGURE 3, and after the information from that column has been transmitted by the unit 18 (FIGURE 7) of the teletypewriter system in a manner to be described, the card is shifted to the next column which is then read. This shift of the card is made under the control of the escapement mechanism in the key punch which is connected by way of the terminal 165 to the relay contacts L45 (1-3). The escapement mechanism is operated to shift the card to the next reading position when a ground connection is introduced to its circuit.

The No. 8 star wheel switch is closed when the card is in its first column, first field position due to the punch at that position on the program card of FIGURE 2a. This causes the tube V1 to be energized assuring that the contacts L56 (1-3) are closed. This occurs after the information from the last column of the last field of the preceding card has been scanned out of the system. This causes the relay L44 to be energized. Then, after the first column of the card being processed has been read, the cam operated switch P5 closes to energize the relay L45 through the contacts L44 (1-3). The latter relay is held energized through the circuit of the discharge tube V1 until the program card of FIGURE 2a is moved by the escapement action to the last column containing a No. 7 star wheel.

The contacts L45 (3-1) close, therefore, at the end of the reading of the first column of the first field of the card being processed. Then, if the contacts L32 (1-4) are closed to indicate that there has been no change in the figures/letters circuit, if the contacts L39 (8-5) are closed to prevent the key punch from going through more than one reading cycle for any one column of the card being processed, and if the contacts L42 (5-8) are closed to indicate that all the information previously in the buffer (L1-L12) has been transferred to the register (L17-L21), a ground is introduced to the circuit of the escapement control in the key punch mechanism 20 of FIGURE 3 by way of the terminal 165. This activates the escapement in the key punch mechanism to cause the card being processed to move to its next column position.

When the card reaches its next column position and is read, the above described operations are repeated. In this manner, the card moves from one position to the next throughout the field being processed, with the punch locations in each column being sensed by the system. When the card reaches the last column of the field, that column is read and the card is shifted to the first column of the next field. The absence of a punch in the No. 8 position of the last column in each field of the program card of FIGURE 2a prevents the escapement mechanism from being actuated for the first column in each field of the card. Instead, the key punch mechanism is controlled by the No. 7 punch on the program card for the first column of the next field if that field is to be read, and this is carried out in exactly the same manner as described above upon the closure of the No. 7 star wheel switch. If the next field is to be skipped, appropriate controls are exerted on the key punch mechanism under the control of the No. 1 and No. 12 punches on the program card of FIGURE 2a.

When the punching in a column of the information card of FIGURE 2b is read by the card reading mechanism 30 of the key punch of FIGURE 3, corresponding ones of the pins 1–12 in FIGURE 6 are closed. Then, at the appropriate time, and under the control of the cam operated switch P5, the relays L1–L16 corresponding to the closed pins are energized. This occurs, of course, only if the relay contacts L44 (1–3) are closed, indicating the presence of a No. 8 transmittal field definition punch in the program card of FIGURE 2a. The information contained in the particular column of the information card is now stored in the buffer relays.

The information stored in the buffer relays L1–L16 is then transferred to the diode matrix 183 of FIGURE 8. The L10, L11 and L12 relay contacts shown under the diode matrix 183 are actuated so as to cause a ground to be placed on a selected one of the terminals 1, J, A, 2, S, K, B, 3, T, L, C, 4, U, M, D, 5, V, N, E, 6, W, O, F, 7, X, P, G, 8, Y, Q, H, 9, Z, R and I. This ground is so placed upon the completion of the circuit through the relay contacts L31 (4–1), L27 (4–1), L42 (8–6). The first contacts L31 (4–1) prevent a transfer from being made until the proper time after a figures or letters shift code has been generated. The second contacts L27 (4–1) assure that no transfer will occur when there is a letters/figures circuit change calling for the generation of corresponding function codes. The third contacts L42 (8–6) are the actual transfer control contacts.

A blank column, such as referred to above, causes the relay L34 to be energized to close the contacts L34 (3–1) and place a ground on the "SP" terminal of the diode matrix 183 of FIGURE 8. This causes a "space" code to be introduced to the register (L17–L21). This latter ground is so placed through the contacts L34 (3–1) and L32 (8–6) or L54 (1–4). The contacts L54 (1–4) assure that the space code will be registered if the first column of a card is blank.

Figures/letters detection is made by the relays L23–L27. These relays cause a ground to be placed on the "Figs" terminal of the diode matrix 183 of FIGURE 8 whenever there is a change from letters to figures, and they cause a ground to be placed on the "Ltrs" terminal whenever there is a change from figures to letters. The ground on the "Ltrs" terminal is made through the relay contacts L24 (6–8), the relay contacts L27 (3–1) and through the transfer control relay contacts L42 (6–8). The ground on the "Figs" terminal is made through the relay contacts L23 (6–8), the relay contacts L27 (3–1) and through the same transfer control relay contacts L42 (6–8).

The circuitry of the figures/letters detector relays (L23–L27) serves to detect a shift from letters to figures and vice versa, so as to cause the appropriate codes to be introduced to the register relays (L17–L21) in response to such a shift, and to remember what was the last shift. These relays L23–L27 detect the information read into the buffer (L1–L12) and when that information indicates (by the No. 10, No. 11 and No. 12 punches on the information card of FIGURE 2b) a shift from letters to figures, or vice versa, the relays L23–L27 cause the information to remain in the buffer for the next cycle of the system and the appropriate figures/letters shift codes to be generated.

As noted above, the circuitry of the relays L23–L27 remembers which code it has generated, and it will not generate a new code until the character introduced to the buffer (L1–L16) changes from alpha-numeric to numeric, or vice versa.

Assume now that the character introduced to the buffer (L1–L16), is a figure and that the last character was a letter. The "figures shift" relay L23 will be energized through the buffer relay contacts in the described manner. The relay L44 will now be energized by the No. 8 star wheel switch so that the contacts L44 (6–8) will be closed. The normally closed contacts L37 (4–1) will also be closed, because the relay L37 is energized only when a blank column is read. The contacts L24 (1–4) will be closed because the letters shift relay L24 is de-energized. A holding circuit is therefore formed for the figures shift relay L23. The contacts L23 (8–6) are now closed to cause the figures shift code to be generated in the register (L17–L21). The figures memory relay L25 is now energized through the contacts L23 (1–3) and through the contacts L37 (4–1) and L44 (6–8) which form the holding circuit. The figures/letters change relay L27 was energized when the figures/letters relay L23 was energized and it holds through the resistor 128 and through the contacts L63 (4–1). The contacts L63 (4–1) open as the relay L63 is energized by the relay L38 closing its contacts 1–3 after the figures shift code has been scanned out of the system.

The "figures memory" relay L25 holds its contacts L25 (1–4) open during the reading of successive columns of the information card. Therefore, no further shift code is generated until an alpha character is encountered. Then, the "letters shift" relay L24 is energized in the stated manner and the figures/letters change relay L27 is simultaneously energized through the L26 (1–4) contacts. This causes the letters shift code to be generated by the closure of the contacts L24 (6–8). Now, the relay L26 is energized to hold the contacts L26 (1–4) open and prevent the generation of any further shift codes until the figures shift relay L23 is again energized.

The memory circuits described above can be broken so that the figures/letters system is reset by the opening of the contacts L37 (1–4). This, as noted, occurs whenever a blank column is encountered in the card being read, so as to cause a space code to be generated. The memory circuits will also be broken at the end of a field, at which time the contacts L44 (8–6) remain open beyond the hold-over time of the memory relays L25 and L26, this being due to the absence of a No. 8 punch on the program card (FIGURE 2a) at the last column in each field. This latter condition also applies during "skip" and "card release."

In the manner described above, therefore, different letters, figures and function codes may be introduced through the diode matrix 183 of FIGURE 8 into the register (L17–L21). This causes the corresponding ones of the contacts L17 (1–3) . . . L21 (1–3) to close. These contacts are held closed by the relay contacts L40 (1–4) until after the distributor 152 has scanned the register. This latter scanning is with respect to the corresponding contacts L17 (8–6) . . . L21 (8–6) in the distributor. The circuit through the relay contacts is completed through the relay contacts L44 (8–6) for columns on the program card at which the No. 8 star wheel switch is closed to energize the relay L44. The circuit is completed through the contacts L30 (1–4) for the last column in each field when the No. 8 field definition star wheel switch has opened. In addition, the circuit is completed through the relay contacts L55 (1–3) for the last column of the last field on the card. This insures that the distributor 152 has scanned the complete register after the reading of the last column of the last field of a card, before the register is released.

When all the above described conditions have been fulfilled, the next closure of the distributor cam operated switch Tc causes the relay L59 to be energized. This completes a circuit to the distributor cycle relay L28 through the contacts L59 (1–3), and L16 (8–6) or L57 (1–3). The contacts L16 (8–6) are closed whenever there is a character in the buffer (L1–L15), and the contacts L57 (1–3) are closed when the system is in line feed mode. The relay L28 feeds a pulse to the distributor clutch magnet 179 by closing its contacts L28 (5–8), so that a code may be introduced from the register relay contacts L17 (8–6) . . . L21 (8–6) to the carrier generator and frequency modulator unit 182 of FIGURE 7, this being under the control of the switch Tc.

For the first column of a field there may be information in the register L1–L21 but no character in the buffer (L1–L15). Under these conditions, the contacts L16 (6–8) in the circuit of the relay L23 will be open, but the contacts L22 (6–8) in the circuit of the relay L29 will be closed. The relay L29 is slow to energize, so that a circuit is first completed for the relay L28 through the contacts L29 (5–8), L22 (6–8) and L44 (6–8). This circuit enables the distributor clutch magnet 179 to be energized and cycle. The relay L29 becomes energized to open the contacts L29 (5–8) to terminate the distributor cycle. The relay L29 is held energized through the resistor 130 until the contacts L44 (6–8) next open. This action permits the starting of the distributor after the first column is read.

As illustrated in FIGURE 8, the diode matrix 183 is also capable of providing a carriage return "CR" code and a "line feed" code to the register (L17–L21). These latter codes are under the control of the relays L47–L53, and L57 (FIGURE 9).

When a card is released from the key punch reading mechanism 30 of FIGURE 3, a circuit is completed for the relay L53 by way of the terminal L (FIGURE 8). The relay L47 now becomes energized after the relay 53 again is de-energized, this being through the contacts L53 (1–3). The relay L53 is held energized until the reset relay L52 is energized to open its contacts L52 (4–1).

For the generation of the carriage return code "CR," the relay L48 is now energized through a circuit including the relay contacts L49 (1–4), L47 (1–3), L53 (8–5), L22 (8–5) and L44 (6–8). The energizing of the relay L48 causes the contacts L48 (1–3) to close and complete the carriage return circuit to the diode matrix. This causes the diode matrix to introduce the carriage return code to the register L17–L21.

The closing of the contacts L48 (1–3) also causes the relay L49 to become energized, after a slight time delay, which de-energizes the relay L48 as the normally closed contacts L49 (1–4) open. The relay L49 is held energized until the reset relay L52 is energized to open the contacts L52 (1–4).

The energizing of the relay L49 at the release of a card in the manner described above to cause a carriage return "CR" code to be generated and thereby return the carriage of the teletypewriter, also causes the relay L50 to be energized by closing the relay contacts L49 (6–8). The energizing of the relay L50 causes the contacts L50 (1–3) to be closed and thereby complete the ground circuit to the LF terminal of the diode matrix, if the contacts L43 (1–4) are closed. This causes the line feed code to be introduced to the register (L17–L21).

The closing of the contacts L50 (1–3) also causes the relay L51 to be energized, and the latter relay is held energized through the resistor 198 and through the contacts L52 (4–1). This causes the relay L43 to be energized to open the normally closed contacts L43 (4–1) and terminate the ground circuit to the "LF" contacts of the diode matrix.

Therefore, upon the release of a card from the key punch mechanism 20 of FIGURE 3, a "carriage return" code is first sent to the teletypewriter receiver to return the carriage to the start position; then a "line feed" code is sent to step up the paper at the receiver to the next position.

In the described manner, therefore, the apparatus and system of the invention permits information recorded on information storage cards in accordance with a particular code to be read and converted to a second code. The apparatus and system of the invention further permits the second code to activate one or more teletypewriters so as to provide a decoded printed record of the information on the storage cards. This latter record, as described, may be provided either locally, or it may be transmitted to a remote point by the teletypewriter system.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for use with a card having a plurality of columns and information recorded in the columns on the card, means operatively associated with the card for sensing the information in each column on the card, means responsive to the sensing of the information in each column on the card for converting the information to a plurality of signals having a pattern representative of such information, means responsive to the conversion of the information in each column on the card to the plurality of signals in the representative pattern for sequentially presenting such signals, and means responsive to the sequential presentation of the signals representing the information in each column on the card for obtaining an advance of the card for the sensing of the information in the next column on the card by the sensing means.

2. The combination set forth in claim 1, including means responsive to the sequential presentation of the signals for each column on the card for preventing the advance of the card to the next column on the card during such sequential presentation.

3. The combination set forth in claim 1, including, means operatively coupled to the card-advancing means for preventing an advance of more than one column in the card upon each sequential presentation of the indications for each column on the card.

4. In combination for use with a card having a plurality of columns and having information recorded in the columns on the card, means operatively associated with the card for sensing information in each of the columns on the card, matrix means responsive to the information sensed in each column on the card for converting such information to a plurality of signals where each signal has first characteristics or second characteristics and where the different signals in the plurality have a particular pattern of the first and second characteristics in representation of the information in the column on the card, means responsive to the production of the signals in the plurality for obtaining a sequential presentation of such signals, and means operative only upon the sequential presentation of the signals for each column on the card for obtaining an advance of the card to the next column for the sensing of the information in such next column.

5. The combination set forth in claim 4, including, means responsive to the operation of the signal-presenting means and operatively coupled to the card-advancing means for preventing the card-advancing means from advancing the card from each particular column to the next column until after the signal-presenting means has completed the sequential presentation of the signals in the particular column.

6. In combination for use with a card having a plurality of columns and having alpha-numeric information recorded in the different columns on the card to indicate numbers and alphabetic letters, means responsive to the information recorded in each column on the card for sensing such information, control means responsive to the sensed information for indicating whether the sensed information constitutes numbers or alphabetic letters, means responsive to the sensed information and to the indications from the control means for producing a plurality of indications in a binary form and in an individual pattern to represent the sensed information, distributor means responsive to the production of the plurality of binary signals for obtaining a sequential presentation of such signals, and means responsive to the sequential presentation of the binary signals for each column on the card for obtaining an advance of the card to the next column for the sensing of the information on the card.

7. The combination set forth in claim 6 in which the indicating means includes memory means for storing information relating to the occurrence of numbers for the successive columns until the subsequent presentation of information relating to alphabetical letters in one of the columns and for storing information relating to the occurrence of alphabetical letters for the successive columns until the subsequent presentation of information relating to numbers in one of the columns.

8. In combination for use with a card having a plurality of columns and having alpha-numeric information recorded in the different columns on the card to indicate numbers and alphabetic letters, means responsive to the information recorded in each column on the card for sensing such information, matrix means responsive to the information sensed by the sensing means for converting such information into a plurality of indications having characteristics in a pattern to represent such information, memory means responsive to the sensed information for storing whether the information sensed in each column on the card is numeric or alphabetic and for changing such stored information when the information on the card varies between numbers and alphabetic letters in the successive columns on the card, distributor means responsive to the operation of the matrix means and the memory means for each column on the card for obtaining a sequential presentation of the plurality of indications for that column, and means responsive to the operation of the distributor means for obtaining an advance of the card to the next column on the card.

9. The combination set forth in claim 8 in which means are operatively coupled to the memory means and to the distributor means to prevent the operation of the distributor means for each column on the card until the operation of the memory means in sensing whether the information in the card is numeric or alphabetic.

10. In combination for use with a card having a plurality of columns and having a plurality of fields each including at least one column and each defined by particular information in the first column of the field and having information recorded in the different columns on the card, means operatively associated with the card for sensing the information in each column on the card and the particular information in the first column of each field, means responsive to the information sensed for each column on the card and to the particular information sensed for the field including such column for converting such information into a plurality of indications in a pattern representative of such information and in accordance with the particular information for the field, means responsive to the operation of the converting means for each column on the card for obtaining a sequential presentation of the indications produced by the converting means for that column on the card, and means responsive to the operation of the last mentioned means for obtaining an advance of the card to the next column on the card.

11. The combination set forth in claim 10, including, means responsive to the sensing of the particular information in the first column of each field for retaining such information during the sensing of the information for the successive columns of that field.

12. In combination for use with a card having a plurality of columns and having a plurality of fields each including at least one column and each defined by particular information in the first column of the field to represent the recording of information in a first field and the skipping of a second field and having information recorded in the columns of at least the first field on the card, means operatively associated with the card for sensing the information in each column of the first field on the card and for sensing the particular information in the first column of the first and second fields on the card, means responsive to the information sensed in each column of the first field on the card for producing a plurality of indications having binary characteristics and occurring in a pattern representing such information, distributor means responsive to the production of the plurality of indications representing each column in the first field on the card for obtaining a sequential presentation of such indications, means responsive to the sequential presentation of the indications in each column of the first field on the card for obtaining an advance of the card to the next column for the sensing of information in the next column, and means responsive to the advance of the card to the second field on the card for preventing any sequential presentation of indications for any of the columns in the second field on the card.

13. The combination set forth in claim 12, including, means responsive to the particular information sensed in the first column of each particular field on the card for storing such particular information during the sensing of the information in the other columns of that particular field on the card, and means responsive to the particular information stored for each field for controlling the operation of the sequential presenting means in the columns of that field.

14. In combination for use with a card having a plurality of columns and having a plurality of fields each including at least one column and each defined by particular information in the first column of the field to represent the recording of information in a first field and the skipping of a second field and having alpha-numeric information recorded in the columns of at least the first field on the card to represent numeric and alphabetic information, means operatively associated with the card for sensing the information in each column of the first field on the card and for sensing the particular information in the first column of the first and second fields on the card, memory means responsive to the sensing of information for each column in the first field on the card for storing whether the information in such column is numeric or alphabetic and for retaining such information until a change between numeric and alphabetic information in one of the successive columns on the card, means responsive to the sensing of the information in each column on the card and responsive to the memory means for converting the information into a plurality of indications each having first or second characteristics and each forming a particular pattern of the first and second characteristics with the other indications to represent such information, distributor means responsive to the operation of the memory means and the matrix means for each column in the first field on the card for obtaining a sequential presentation of the indications for that column, means responsive to the sequential presentation of the indications for each column in the first field on the card for obtaining an advance to the next column on the card, and means responsive to the advance of the card through the columns of the first field and responsive to the sensing of the particular information in the first column of the second field for preventing any presentation of sequential information during the advance of the card through the columns of the second field.

15. The combination set forth in claim 14, including, means responsive to the disposition of the card at the last column in the first field for releasing the memory means, and means responsive to the disposition of the card at the last column in the first field for preventing the operation of the distributor means.

16. In combination for use with a card having at least one field and having a plurality of columns in the field and having alpha-numeric information recorded in the columns of the field to represent numeric and alphabetic information, means operatively associated with the card for sensing the information in each column on the card, memory means responsive to the information sensed in each column on the card for indicating the presentation of numeric or alphabetic information in that column and for storing such information until a change in the presentation of numeric or alphabetic information in a successive one of the columns in the first field on the card, matrix means responsive to the sensing of information in each column in the first field on the card and responsive to the operation of the memory means for producing a plurality of signals each having first or second characteristics in a distinctive pattern representing the information in that column, distributor means responsive to the production of the plurality of signals for each column on the card for obtaining a sequential presentation of such signals, means responsive to the sequential presentation of the signals for each column in the first field on the card for obtaining an advance of the card to the next column in the first field, and means responsive to the disposition of the card at the last column in the first field for releasing the memory means.

17. The combination set forth in claim 16, including, means responsive to a change in the operation of the memory means for preventing the operation of the distributor means.

18. In combination for use with a plurality of cards disposed in a particular sequence and each having a plurality of columns and each having information recorded in the different columns on the card, means operatively coupled to each particular card in the sequence for sensing the information in each column of the card, matrix means responsive to the sensing of the information on each column of the particular card for producing a plurality of signals having individual characteristics in a pattern representative of such information, distributor means responsive to the production of the plurality of signals for each column on the card being sensed for obtaining a sequential presentation of such signals, means responsive to the sequential presentation of the signals for each column on the card being sensed for obtaining an advance of the card to the next column on the card, and means responsive to the advance of the card being sensed to the last column on the card for obtaining a replacement of such card with the next card in the sequence for the sensing of the information in such next card.

19. The combination set forth in claim 18, including, means responsive to the replacement of each card by the next card in the sequence for preventing the distribution means from operating during such replacement.

20. In combination for use with a plurality of cards disposed in a particular sequence and each having a plurality of columns and each having information recorded in the different columns on the card for the sequential presentation of a plurality of indications by teletypewriter means in representation of the information in each column where the teletypewriter means include a carriage movable in a first direction from first to second positions during the presentation of the indications by the teletypewriter means to facilitate the sequential presentation of the indications and returnable from the second position to the first position, means operatively coupled to each particular card in the sequence for sensing the information in each column of the card, means responsive to the sensing of information in each column of the card for producing a plurality of indications having binary characteristics in a pattern representative of the information in each column, means responsive to the production of the plurality of indications for each column on the card being sensed and operatively coupled to the teletypewriter means for obtaining a sequential presentation of the signals by the teletypewriter means, means responsive to the sequential presentation of the signals by the teletypewriter means for obtaining an advance of the card being sensed to the next column on the card for the sensing of the information in the next column on the card, means responsive to the advance of the card to the last column on the card being sensed to obtain a replacement of the card by the next card in the sequence for the sensing of information in the different columns of the next card, means responsive to the advance of the card being sensed from each column to the next column for obtaining a movement of the carriage in the first direction from the first position toward the second position, and means responsive to the replacement of each card by the next card in the sequence for obtaining a return of the teletypewriter means from the second position to the first position.

21. The combination set forth in claim 20, including, means operatively coupled to the card-advancing means for preventing the card from being advanced more than one column at any one time.

22. The combination set forth in claim 20, including, means responsive to the replacement of each card with the next card in the sequence for preventing the presentation of any indications during such replacement.

References Cited in the file of this patent

UNITED STATES PATENTS

| | | |
|---|---|---|
| 2,604,538 | Halvorsen | July 22, 1952 |
| 2,702,380 | Brustman et al. | Feb. 15, 1955 |
| 2,774,429 | Rabenda | Dec. 18, 1956 |
| 2,830,759 | Hudes et al. | Apr. 15, 1958 |
| 2,878,313 | Tolson et al. | Mar. 17, 1959 |
| 2,921,132 | Fivel | Jan. 12, 1960 |
| 2,951,901 | Rugaber et al. | Sept. 6, 1960 |